March 28, 1939.     E. C. SITTLER ET AL     2,152,157
REFRIGERATING APPARATUS
Original Filed April 30, 1935
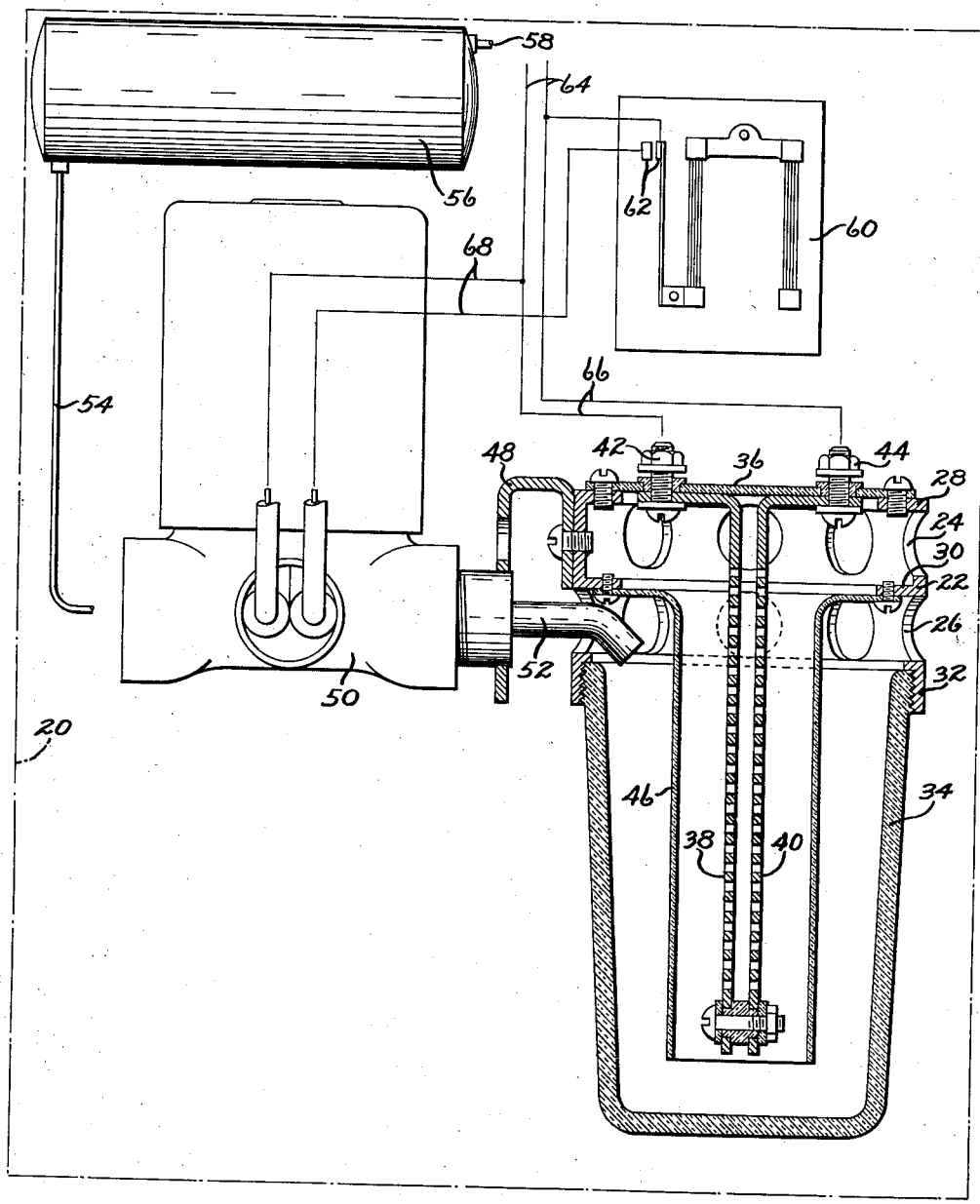
INVENTOR.
Edwin C. Sittler
BY Richard S. Gaugler
ATTORNEYS Patented Mar. 28, 1939

2,152,157

UNITED STATES PATENT OFFICE 2,152,157

REFRIGERATING APPARATUS

Edwin C. Sittler and Richard S. Gaugler, Dayton, Ohio, assignors to General Motors Corporation, Dayton, Ohio, a corporation of Delaware Application April 30, 1935, Serial No. 18,978
Renewed October 7, 1937

8 Claims. (Cl. 219—40)

This invention relates in a general way to refrigerating apparatus and more particularly to humidity control and humidifying means.

Humidifying means are often used in connection with refrigerating systems under certain conditions where it is desired to maintain a high humidity. Humidifying means are often used for air conditioning and other applications where it is necessary to raise the humidity or to maintain a high humidity.

It has been customary to provide humidification by heating the water by some suitable heating means such as an electric heater or other form of heat. Such humidifying devices have normally been controlled by controlling the supply of heat such as by interposing a switch in the circuit of an electric heater. Inasmuch as the electric heaters require and take a large amount of electric current it is ordinarily necessary to use a switch having ample capacity for controlling heavy currents. Such switches, however, ordinarily require considerable force for their operation and are also rather expensive. In order to provide a sensitive control system employing a switch in series with the heater, it is usually necessary to provide a relay control by a sensitive control element such as a humidostat for controlling the operation of the switch which controls the heater.

It is an object of our invention to provide a less expensive and more practical scheme of humidity wherein the supply of the liquid to be vaporized is controlled instead of controlling the heating means directly.

It is a further object of our invention to provide an improved means for controlling the heating of the liquid.

It is a more specific object of our invention to provide an improved vaporizing means in which the supply of liquid to be vaporized is controlled and the heating of the liquid supplied is controlled automatically by the presence of the liquid.

It is another object of our invention to provide a vaporizer employing a plurality of insulated charged electrodes which are supplied the liquid to be vaporized so as to cause the liquid to complete an electric circuit between the electrodes to vaporize the liquid as it is supplied.

Further objects and advantages of the present invention will be apparent from the following description, reference being had to the accompanying drawing, wherein a preferred form of the present invention is clearly shown.

In the drawing the figure is a view partly diagrammatic and partly in section of a humidifying apparatus and control means embodying our invention.

Briefly in our disclosure we provide a water tank 5 which supplies water to a solenoid valve located directly adjacent a cup containing a pair of insulated charged electrodes and a humidity responsive switch is provided within the enclosure 10 to be humidified for controlling the energization of the solenoid valve so as to control the flow of water to be humidified into the cup which contains the electrodes. When the water within the cup reaches the level of the electrodes 15 the circuit which includes the electrodes is completed and the water becomes heated by the current flowing between the electrodes and is vaporized to increase the humidity within the enclosure.

Referring now more particularly to the drawing, there is indicated an enclosure 20 to be humidified. This enclosure contains a humidifying apparatus including a casting 22 containing an upper row of apertures 24, a lower row of apertures 26, an upper flange 28, a middle flange 30, and a lower flange 32. The lower flange 32 is threaded and receives the threaded upper edge of a glass or quartz container or cup 34 for receiving the liquid to be vaporized. Fastened to the top flange is an insulating disc 36 to which is fastened in spaced relation a pair of electrodes 38 and 40 which are provided with flanges at their upper end fastened to the insulating disc 36 by the binding posts 42 and 44. The lower portion of the electrodes are surrounded by a sleeve or chimney 46 of insulating material which is provided with a flange at its upper end fastened to the middle flange 30 of the casting 22. Fastened to one side of the casting 22 by the bracket 48 is a solenoid valve 50 which is provided with a spout 52 extending through one of the apertures 26 into the space between the sleeve or chimney 46 and the wall of the cup 34 and the casting 22.

This solenoid valve 50 is supplied with the liquid to be vaporized, ordinarily water, through the tube or conduit 54 connected to the supply tank 56 which may be filled through the opening 58. The solenoid valve 50 is controlled by a humidostat or humidity responsive switch means 60 also located within the enclosure 20 which opens and closes a pair of switch contacts 62 according to the humidity within the enclosure 20. These switch contacts 62 are located in series with the coil of the solenoid valve 50. The contacts 62 and the solenoid valve 50 are connected in parallel electric circuit relation with the electrodes 38 and 40, all of which receive a supply of electric energy through the electric conductors 64. The electric conductors 64 are connected to the binder posts 42 and 44 through the electric circuit 66 and are connected through the electric circuit 68 to the switch contacts 62 and the solenoid valve 50.

In normal operation of the apparatus the electrodes 38 and 40 are constantly charged with electric energy but since they are insulated from each other no current will flow between them unless a liquid or some other conductor bridges the electrodes. When the humidity within the enclosure is high the humidity control switch 60 will have its contacts 62 in the open position. However, when the humidity becomes low the contacts 62 will close, thus energizing the solenoid valve 50 and causing it to open. The opening of the solenoid valve 50 permits liquid to flow at a slow rate into the cup 34. When the liquid reaches the bottom of the electrodes 38 and 40 the electrodes will be bridged by an electrical conductor and current will flow from one electrode to the other through the liquid. This will heat the liquid and cause it to be vaporized. When the humidity of the enclosure is raised to the point at which the switch is set the humidity responsive switch 60 will open, thus de-energizing the solenoid valve and stopping the flow of the liquid to be vaporized. Inasmuch as the flow of liquid into the cup is at a rather slow rate the vaporization will stop almost immediately and as soon as the liquid level is below the bottom of the electrodes the circuit including the electrodes will be opened and the flow of current within the vaporizer will cease.

In this way we have provided a vaporizer for water and other liquids capable of carrying an electric current which is simple, reliable and practical. The humidity responsive switch 60 is only required to control the small amount of current necessary for operating the solenoid valve 50 and is not required to control the much greater amount of current which flows to the electrodes 38 and 40 during vaporization. In this way we have provided an improved vaporizing device.

While the form of embodiment of the invention as herein disclosed constitutes a preferred form, it is to be understood that other forms might be adopted, all coming within the scope of the claims which follow.

What is claimed is as follows:

1. A vaporizing means including a plurality of insulated electrodes, liquid confining means for confining liquid to bring it into contact with the electrodes, means for constantly applying electric energy to said electrodes during normal operation of the vaporizing means, means for supplying a liquid to be vaporized to said liquid confining means, electromagnetic flow control means for controlling the flow of the liquid to said liquid confining means for controlling the vaporization of the liquid, and means for energizing and deenergizing said electromagnetic means independently of said electrodes for controlling the vaporization of the liquid independently of the application of the electric energy to said electrodes.

2. A vaporizing means including a plurality of insulated electrodes, liquid confining means for confining liquid to bring it into contact with the electrodes, means for constantly applying electric energy to said electrodes during normal operation of the vaporizing means, means for supplying a liquid to be vaporized to said liquid confining means, electromagnetic flow control means for controlling the flow of the liquid to said liquid confining means for controlling the vaporization of the liquid and switch means for controlling the energization of the electromagnetic flow control means independently of the application of electric energy to the electrodes for controlling the vaporization of the liquid independently of the application of electric energy to the electrodes.

3. A vaporizing means including a plurality of insulated electrodes, liquid confining means for confining liquid to bring it into contact with the electrodes, means for continuously applying electric energy to said electrodes during normal operation of the vaporizing means, means for supplying a liquid to be vaporized to said liquid confining means, flow control means for controlling the flow of the liquid to said liquid confining means for controlling the vaporization of the liquid, and humidity responsive means for opening and closing said flow control means independently of the application of electric energy to said electrodes, said flow control means being both opened and closed in direct response to the operation of the humidity responsive means.

4. A vaporizing means including a plurality of electrodes insulated from each other, liquid confining means for confining liquid to bring it into contact with the electrodes, means for continuously applying electric energy to said electrodes during normal operation of the vaporizing means, means for supplying a liquid to be vaporized to said liquid confining means, electrically operated flow control means for controlling the flow of liquid to said liquid confining means for controlling the vaporization of the liquid, means for energizing and deenergizing said electrically operated flow control means independently of said electrodes for controlling the vaporization of liquid independently of the application of the electric energy to said electrodes.

5. A vaporizing means including a plurality of electrodes insulated from each other, liquid confining means for confining liquid to bring it into contact with the electrodes, means for continuously applying the electric energy to said electrodes during normal operation of the vaporizing means, means for supplying a liquid to be vaporized to said liquid confining means, electrically controlled flow control means for controlling the flow of liquid to said liquid confining means for controlling the vaporization of the liquid, switch means in series with said electrically operated control means independent of the electric energy flowing through said electrodes for controlling the energization of the electrically operated flow control means independently of the application of electric energy to the electrodes for controlling the vaporization of the liquid independently of the application of electric energy to the electrodes.

6. A vaporizing means including a plurality of insulated electrodes, liquid confining means for confining liquid to bring it into contact with the electrodes, means for applying electric energy to said electrodes during normal operation of the vaporizing means, means for supplying to said liquid confining means a liquid to be vaporized, flow control means for controlling the flow of liquid to said liquid confining means to control the vaporization of the liquid, and humidity responsive means for opening said flow control means in direct response to a predetermined low humidity and for closing said flow control means in direct response to a predetermined high humidity to control the vaporization of the liquid.

7. A vaporizing means including a plurality of electrodes insulated from each other, liquid confining means for confining liquid to bring it into contact with the electrodes, means for applying electric energy to said electrodes during normal operation of the vaporizing means, means for supplying to said liquid confining means a liquid to be vaporized, electrically controlled flow control means for controlling the flow of liquid to said liquid confining means for controlling the vaporization of the liquid, switch means in series with said electrically controlled means for controlling the energization of the electrically operated flow control means to control the vaporization of the liquid, and humidity responsive means for controlling the operation of said switch means.

8. A vaporizing means including a plurality of electrodes insulated from each other, liquid confining means for confining liquid to bring it into contact with the electrodes, means for applying electric energy to said electrodes during normal operation of the vaporizing means, means for supplying to said liquid confining means a liquid to be vaporized, electrically controlled flow control means for controlling the flow of liquid to said liquid confining means for controlling the vaporization of the liquid, and switch means in series with said electrically controlled means for controlling the energization of the electrically operated flow control means to control the vaporization of the liquid.

EDWIN C. SITTLER.
RICHARD S. GAUGLER.